(12) United States Patent
Gahimer et al.

(10) Patent No.: US 10,160,379 B2
(45) Date of Patent: Dec. 25, 2018

(54) INTEGRATION OF SIDE REFLEX AND LIGHT PIPE SIDE MARKER

(71) Applicant: Valeo North America, Inc., Troy, MI (US)

(72) Inventors: Jeremy Gahimer, Greenwood, IN (US); Thomas Maire, Seymour, IN (US); Charles Crespin, Seymour, IN (US); Pascal Haillant, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 35 days.

(21) Appl. No.: 15/395,364

(22) Filed: Dec. 30, 2016

(65) Prior Publication Data

US 2018/0186282 A1 Jul. 5, 2018

(51) Int. Cl.
| | |
|---|---|
| *B60Q 1/32* | (2006.01) |
| *B60Q 1/26* | (2006.01) |
| *F21V 7/04* | (2006.01) |
| *F21V 8/00* | (2006.01) |
| *G02B 5/04* | (2006.01) |
| *G02B 5/12* | (2006.01) |
| *F21V 7/00* | (2006.01) |
| *F21S 41/24* | (2018.01) |
| *F21S 41/33* | (2018.01) |
| *G02B 5/122* | (2006.01) |

(52) U.S. Cl.
CPC ............. *B60Q 1/32* (2013.01); *B60Q 1/2619* (2013.01); *F21S 41/24* (2018.01); *F21S 41/337* (2018.01); *F21V 7/00* (2013.01); *F21V 7/048* (2013.01); *G02B 5/122* (2013.01); *G02B 6/0096* (2013.01)

(58) Field of Classification Search
CPC .......... B60Q 1/32; B60Q 1/2619; G02B 5/04; G02B 5/12; G02B 6/0028; G02B 6/0096; G02B 5/122; F21V 7/00; F21V 7/041; F21V 7/048; F21S 41/24; F21S 43/241; F21S 41/30; F21S 41/322; F21S 41/323; F21S 41/33; F21S 41/337; F21S 43/315
See application file for complete search history.

(56) References Cited

U.S. PATENT DOCUMENTS

| | | | |
|---|---|---|---|
| D250,059 S | 10/1978 | Bleiweiss | |
| 5,434,754 A * | 7/1995 | Li | B60Q 1/0011 362/299 |
| 5,905,826 A * | 5/1999 | Benson, Jr. | B60Q 1/30 362/554 |
| 6,036,340 A * | 3/2000 | Fohl | B60Q 1/0011 362/511 |

(Continued)

FOREIGN PATENT DOCUMENTS

| | | |
|---|---|---|
| CN | 104566084 A | 4/2015 |
| KR | 10-2010-0044655 A | 4/2010 |

(Continued)

*Primary Examiner* — Alan B Cariaso
(74) *Attorney, Agent, or Firm* — Oblon, McClelland, Maier & Neustadt, L.L.P.

(57) ABSTRACT

A lighting device including a reflector having a plurality of reflex pins, a light pipe integrally connected to the reflector along the periphery of the reflector forming a neck between the light pipe and the reflector, wherein the light pipe and the reflector function independently, and a light source connected to the light pipe.

20 Claims, 3 Drawing Sheets

(56) References Cited

U.S. PATENT DOCUMENTS

| | | | |
|---|---|---|---|
| 6,407,785 B1* | 6/2002 | Yamazaki | G02B 6/0008 |
| | | | 349/113 |
| 9,915,406 B2* | 3/2018 | Hohmann | F21S 43/245 |
| 2006/0164861 A1* | 7/2006 | Maeda | G02B 6/0018 |
| | | | 362/615 |
| 2008/0165548 A1* | 7/2008 | Misawa | B60Q 1/2607 |
| | | | 362/487 |

FOREIGN PATENT DOCUMENTS

| KR | 10-2012-0065870 A | 6/2012 |
|---|---|---|
| KR | 10-2013-0136105 A | 12/2013 |

\* cited by examiner

INTEGRATION OF SIDE REFLEX AND LIGHT PIPE SIDE MARKER

BACKGROUND

Field of Disclosure

The present disclosure relates to the field of automotive lighting technology, in particular to automotive side marker lights.

Description of the Related Art

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

Side-marker lamps and reflectors are typically installed on the side of a vehicle on one or more of a bumper, a door, or a side mirror for example. The side-marker lamps are intended to clearly show a presence of the vehicle, as well as a position and a direction of travel of the vehicle from oblique angles.

Conventionally, the side marker includes a reflector portion that reflects light from an external light source, and a side marker light portion having its own light source. The reflector reflects light from the side to show a position of a vehicle when viewed from certain angles. The side marker light portion can also give a lit position of the vehicle from different angles. For side markers that are lit, a compact and cost-effective solution to package the reflective portion, lighted portion and light source together is desired.

SUMMARY

According to an embodiment of the present disclosure, there is provided a lighting device. The lighting device includes a reflector having a plurality of reflex pins, a light pipe integrally connected to the reflector along the periphery of the reflector forming a neck between the light pipe and the reflector, wherein the light pipe and the reflector are intended to function independently, and a light source connected to the light pipe.

Furthermore, the neck has a neck thickness in the range 2 mm to 3.5 mm. The neck has a neck length in the range 1.75 mm to 10 mm. A ratio of said neck thickness to said neck length is 1:3.

The reflector portion is configured to reflect of external light incident thereon.

The reflex pins have a first base angle and a first peak angle such that an exterior light is reflected by the surface of the reflex pin without interfering with the light from the light pipe.

The light pipe portion comprises a light pipe and prisms. The light pipe has an opening along a circumference of the light pipe to define said neck. The opening in the light pipe is maintained in the range 1.75 mm to 3 mm. The opening of the light pipe portion is seamlessly connected to the neck creating a channel between the light pipe portion and the reflector portion.

The lighting device is a side marker.

Furthermore, according to an embodiment of the present disclosure, there is provided a vehicle comprising the lighting device, as discussed above.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

Figure 1:
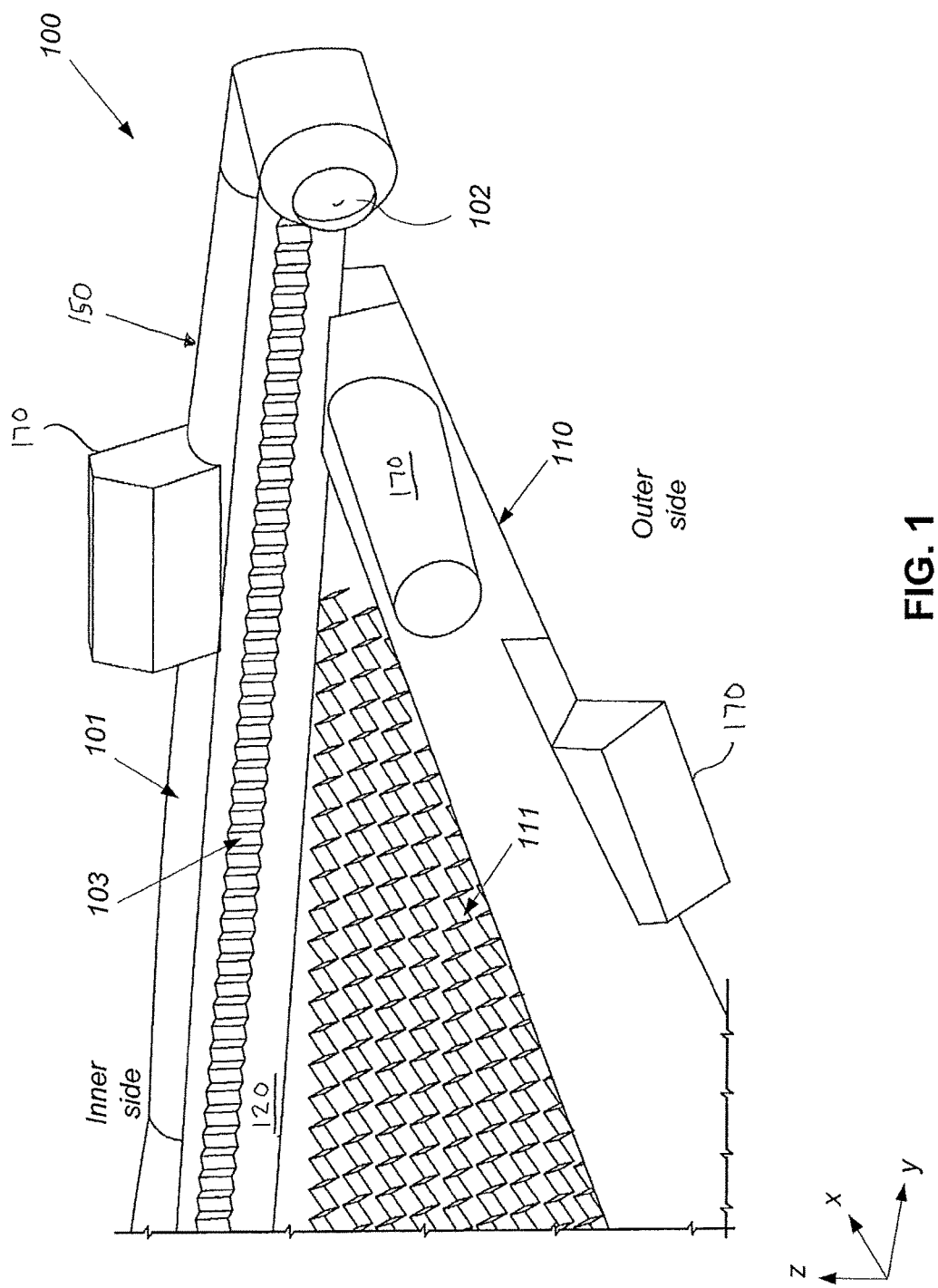
FIG. 1 is a perspective illustration of a side marker according to an exemplary embodiment of the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "side," "height," "length," "width," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

As noted above, a compact and cost effective solution to packaging the light source, side marker and reflectors together is desired. Efforts to combine these components may integrate a reflective portion and a lens of the lighted portion in a single piece, and a separate light source that provides direct lighting primarily through the lens. The present inventors have recognized, however, that these systems often have a dark boundary between the lighted portion and reflective portion, which is not aesthetically appealing. Embodiments disclosed herein provide a side marker reflector integrated in a single piece to provide a unique look which minimizes dark gaps or boundaries between the lighted portion and reflective portion.

FIG. 1 is a perspective illustration of a side marker 100 according to an exemplary embodiment of the present disclosure. The side marker 100 includes a reflector portion 110 integrally connected to a light pipe portion 150. The light portion 150 receives light from a remote light source 102 optically coupled thereto. The light source 102 may be positioned so that collimated light enters the light pipe portion 150.

Figure 3:
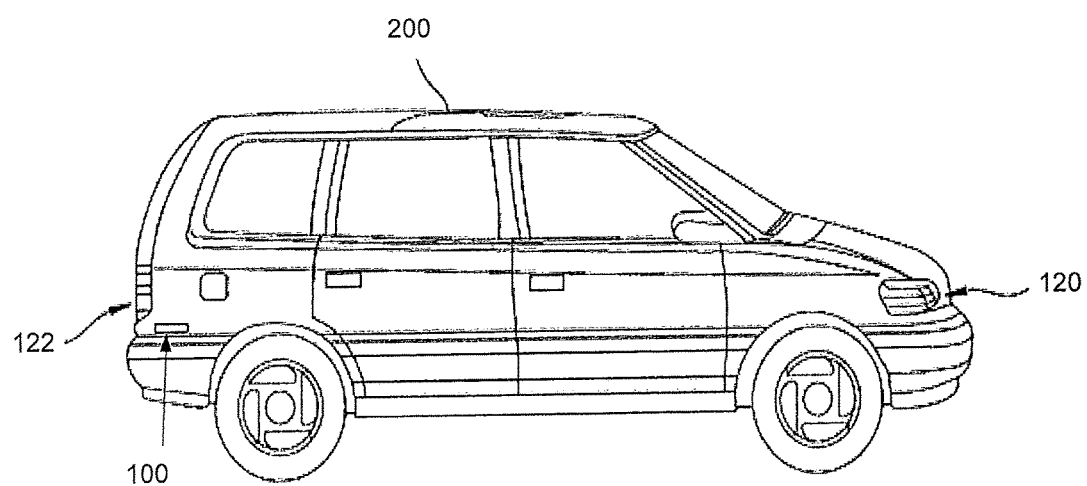
FIG. 3 is an example vehicle on which embodiments of the present invention may be implemented.

The light pipe portion 150 includes a light pipe 101 which is a cylindrical tube with a circular cross-section, and a plurality of prisms 103 (referred as prisms 103 hereinafter) integrated into the light pipe 101 along a length thereof. The light pipe 101 permits light from the light source 102 to travel by total internal reflection (TIR) along the light pipe portion 150. FIG. 1 generally shows an inner side of the side marker 100. Various attachment portions 170 may be included to facilitate alignment and/or attachment of the side marker 100 with a vehicle as shown in FIG. 3. The prisms 103 reflect light which can travel to the outside of the vehicle. The light pipe 101 extends along the periphery of the reflector 110, and spreads light over a large area in a direction controlled by the prisms 103 as it exits the prisms 103. The light pipe 101 is approximately 160 mm long and has a diameter of approximately 6 mm. The prisms 103 are 1 mm wide and separated by approximately 1 mm.

The reflector portion 110 reflects light entering from an external source on the outer side to highlight a presence or the position of the vehicle. The reflector 110 is positioned such that the light travelling through the prisms 103 of the light pipe 101 on to the inner surface has minimal interaction with the light entering from the outside of the vehicle as discussed below. The reflector portion 110 includes a series of reflex pins 111 (referred as reflex pins 111 hereinafter) on the inner surface and an outer lens (not illustrated) attached on the outer side. In the embodiment of FIG. 1, the reflex pins 111 have a saw-tooth pattern and are formed approximately parallel to the light pipe 101. As such, the light pipe 101 and the reflex pins 111 are installed on similar axis (e.g., y-axis).

Figure 2:
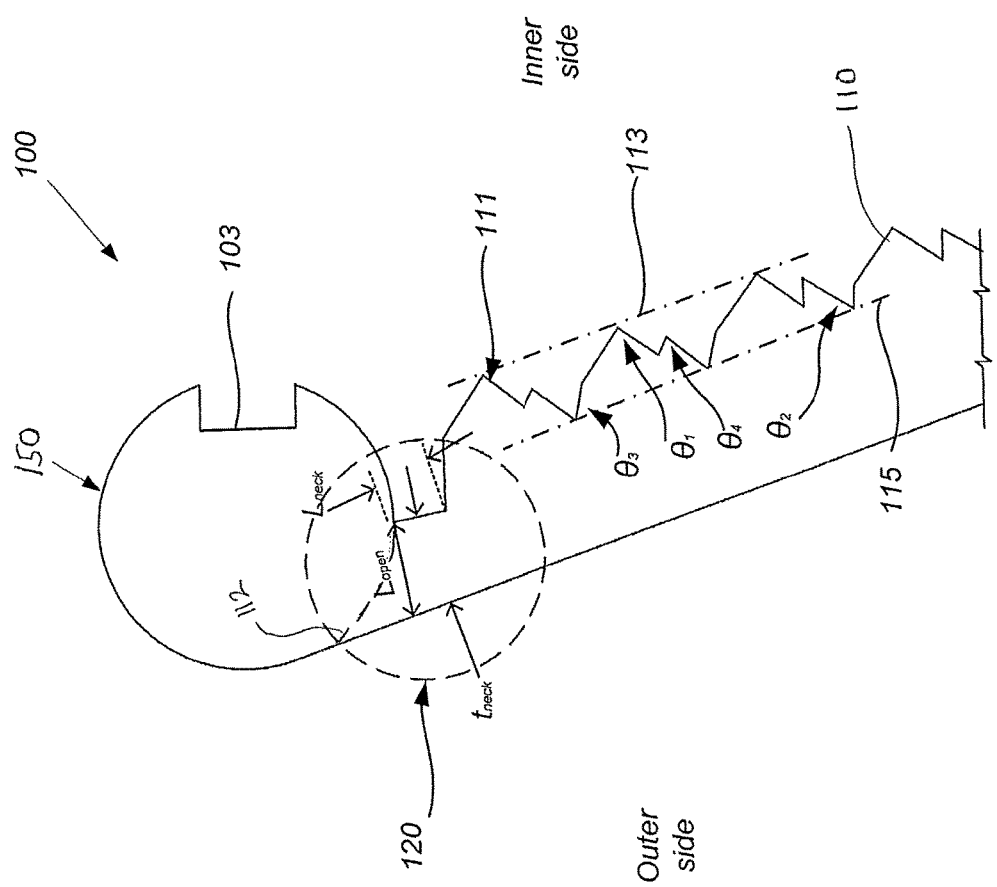
FIG. 2 is a cross section view of the side marker of FIG. 1 according to an exemplary embodiment of the present disclosure.

FIG. 2 is a cross section view of the side marker of FIG. 1 according to an exemplary embodiment of the present disclosure. The light pipe 101 is molded to the reflector 110 forming a neck 120. The neck 120 is a connecting junction between the light pipe portion 150 and the reflector portion 110. In the embodiment of FIG. 2, the reflector portion extends tangentially from the circumference of the light pipe 101 to the reflector 110. Thus, connection of the light pipe portion 150 with the reflector portion 110 interrupts a circumference of the light pipe 101 as shown by phantom line 112.

The present inventors recognized that this interruption permits the light emitted from the light pipe 101 to travel across the neck 120, which diminishes efficiency of the light pipe and may create hot spots. For example, the light from the light pipe 101 can travel downwards along the z-direction though the neck 120 and mix with light reflected by reflex pins 111 reducing light output from the light pipe which may diminish light output from the lighted portion below acceptable safety levels. Further, the light from the light pipe 101 via the neck 120 can travel to the reflector 101 interfering with the function of the reflector 110 to cause hot spots. Hot spots are localized high intensity light spots. Hot spots are undesirable as it is against the safety requirements of a reflector as well as it affects the aesthetics of the automotive lamps.

According to the present disclosure, the side marker 100 can minimize such reduced efficiency and interference and allow the reflector 110 and the light pipe 101 to function more independently. Specifically, the inventors discovered that varying parameters of the neck 120, reflex pins 111 and/or the light pipe 101 can minimize hot spots. The neck 120 has a neck thickness $t_{neck}$. The neck thickness $t_{neck}$ is a function of an intensity of the light emitted from the light pipe 101. Increasing the neck thickness $t_{neck}$ allow more light to be passed through the neck 120 creating hot spots.

As such, the neck thickness $t_{neck}$ should be maintained such that the light pipe 101 and the reflector 110 can function somewhat independently while maintain structural strength. For example, a thin neck would be desirable; however, if the neck 120 is too thin, it can be difficult to manufacture using a suitable molding process. Also, the thin neck can structurally weaken the device 100, leading to failure.

A neck length $L_{neck}$ of the neck can also be another factor that can impact the functioning of the light pipe 101 and the reflector 120 independently. A long neck is desirable characteristic of the neck 120 to physically separate the light pipe portion 150 and reflector portion 110. However, a long neck can cause a perceptible dark spot or gap between the light pipe 101 and reflector 110, which is undesirable aesthetically. According to embodiments of the invention, the neck thickness $t_{neck}$ and neck length $L_{neck}$ are selected to permit feasible molding (in a single mold tool) of an integrated side reflex device 100 having a lightpipe portion and a reflector portion that can function independently to meet legal lighting requirements as well as aesthetic requirements for consumer appeal.

In one example, the neck thickness $t_{neck}$ can be between 2-3.5 mm and preferably maintained between 1.75-3.75 mm.

Similarly, the neck length $L_{neck}$ can be between 1.75-10 mm and preferably maintained between 2-4 mm. The ratio of the neck length $L_{neck}$ to the neck thickness $t_{neck}$ should be maintained between 1-3.

Further, several parameters of the reflex pins 111 can be adjusted. The reflex pins 111 can have a hexagonal cross section. The faces of reflex pins 111 can be cut at angles so that light reflective surfaces manufactured from those pins reflect light from their surfaces with a certain spread of the light over a given distance.

For example, the reflex pins 111 can have a first peak angle $\theta_1$, a second peak angle $\theta_2$, a first base angle $\theta_3$, a second base angle $\theta_4$. The angles of the reflex pins 111 are such that the light incident from the outside is reflected back from the reflex pins 111 in same direction from which it came and do not interfere with the light from the light pipe 101. The first peak angle $\theta_1$, the second peak angle $\theta_2$, the first base angle $\theta_3$, and the second base angle $\theta_4$ are such that the light from outside does not pass through the reflex pins 111 and interfere with the light reflected from prisms 103 on the inside. Thus, the reflector 110 and the light pipe 101 can function independent of each other.

Further, the height and depth of the reflex pins 111 can be varied. A first peak line 113 indicates the maximum height of the reflex pins 111, and a first valley line 115 indicates the maximum depth of the reflex pins 111. The distance between the first peak line 113 and the first valley line 115 indicates the thickness of the reflex pins 111. For example, the thickness of the reflex pins 111 can be approximately 2.38 mm.

Further, the factors related to the light pipe 101 can be varied. For example, an amount of opening $L_{open}$, and the intensity of the light can be adjusted. Typically, the intensity of the light is based on the automotive safety standards for the reflectors or side markers. The amount of opening $L_{open}$ is an opening in the circumference of the light pipe 101 to enable seamless connection with the neck 120. As the amount of opening $L_{open}$ increases, the amount of light passed from the light pipe 101 to the neck 120 also increases. Hence, the amount of opening $L_{open}$, should be maintained such that it does not interfere with the reflector 110 function and also prevent generation of hotspots. The amount of opening $L_{open}$, can be between 1.75-3 mm and preferably maintained between 2-2.5 mm. The opening of the light pipe is seamlessly connected to the neck creating a channel between the light pipe and the reflector.

While certain embodiments have been described, these embodiments have been presented by way of example only, and are not intended to limit the scope of the present disclosures. Indeed, the novel apparatus described herein can be embodied in a variety of other forms; furthermore, various omissions, substitutions and changes in the form of the apparatus described herein can be made without departing from the spirit of the present disclosures. The accompanying claims and their equivalents are intended to cover such forms or modifications as would fall within the scope and spirit of the present disclosures.

What is claimed is:

1. A lighting device, comprising:
   a reflector portion configured to reflect external light incident thereon;
   a light pipe portion integrally connected to the reflector portion along a periphery of the reflector portion forming a neck between the light pipe portion and the reflector portion; and
   a light source optically coupled to the light pipe portion, wherein said neck is dimensioned to minimize mixing of said external light and light from said light source.

2. The lighting device according to claim 1, wherein said neck has a neck thickness in the range 2 mm to 3.5 mm.

3. The lighting device according to claim 2, wherein said neck has a neck length in the range 1.75 mm to 10 mm.

4. The lighting device according to claim 3, wherein a ratio of said neck thickness to said neck length is 1:3.

5. The lighting device according to claim 1, wherein the reflector portion is configured to reflect of external light incident thereon.

6. The lighting device according to claim 1, wherein the reflector portion includes a reflex pin with a first base angle and a first peak angle so an exterior light is reflected by the surface of the reflex pin without interfering with the light from the light pipe portion.

7. The lighting device according to claim 1, wherein the light pipe portion comprises a light pipe and prisms.

8. The lighting device according to claim 7, wherein the light pipe has an opening along a circumference of the light pipe to define said neck.

9. The lighting device according to claim 8, wherein the opening in the light pipe is maintained in the range 1.75 mm to 3 mm.

10. The lighting device according to claim 8, wherein the opening of the light pipe is seamlessly connected to said neck creating a channel between the light pipe portion and the reflector portion.

11. The lighting device according to claim 1, wherein the lighting device is a side marker.

12. A vehicle fitted with a lighting device, comprising:
    a reflector portion configured to reflect external light incident thereon;
    a light pipe portion integrally connected to the reflector portion along a periphery of the reflector portion forming a neck between the light pipe portion and the reflector portion; and
    a light source optically coupled to the light pipe portion, wherein said neck is dimensioned to minimize mixing of said external light and light from said light source.

13. The vehicle fitted with the lighting device according to claim 12, wherein said neck has a neck thickness in the range 2 mm to 3.5 mm and a neck length in the range 1.75 mm to 10 mm.

14. The vehicle fitted with the lighting device according to claim 13, wherein a ratio of said neck thickness to said neck length is 1:3.

15. The vehicle fitted with the lighting device according to claim 12, wherein the reflector portion includes a reflex pin with a first base angle and a first peak angle so an exterior light is reflected by the surface of the reflex pin without interfering with the light from the light pipe portion.

16. The vehicle fitted with the lighting device according to claim 12, wherein the light pipe portion comprises a light pipe and prisms.

17. The vehicle fitted with the lighting device according to claim 16, wherein the light pipe has an opening along a circumference of the light pipe to define said neck.

18. The vehicle fitted with the lighting device according to claim 17, wherein the opening in the light pipe is maintained in the range 1.75 mm to 3 mm.

19. The vehicle fitted with the lighting device according to claim 17, wherein the opening of the light pipe is seamlessly connected to said neck creating a channel between the light pipe portion and the reflector portion.

20. The vehicle fitted with the lighting device according to claim 12, wherein the lighting device is a side marker.

\* \* \* \* \*